United States Patent
Hohl et al.

(10) Patent No.: US 9,959,089 B2
(45) Date of Patent: *May 1, 2018

(54) MOBILE AUDIO PLAYER WITH INDIVIDUALIZED RADIO PROGRAM

(71) Applicant: SONY CORPORATION, Tokyo (JP)

(72) Inventors: Fritz Hohl, Stuttgart (DE); Shin Saito, Stuttgart (DE)

(73) Assignee: Sony Corporation, Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 14/984,980

(22) Filed: Dec. 30, 2015

(65) Prior Publication Data

US 2016/0117145 A1    Apr. 28, 2016

Related U.S. Application Data

(63) Continuation of application No. 12/828,715, filed on Jul. 1, 2010, now Pat. No. 9,230,018.

(30) Foreign Application Priority Data

Jul. 30, 2009  (EP) ..................................... 09166839

(51) Int. Cl.
  *G06F 17/00*  (2006.01)
  *G06F 3/16*  (2006.01)
  (Continued)

(52) U.S. Cl.
  CPC ........ *G06F 3/165* (2013.01); *G06F 17/30749* (2013.01); *G06F 17/30761* (2013.01);
  (Continued)

(58) Field of Classification Search
  CPC .............. G06F 3/165; G06F 17/30749; G06F 17/30761; G06F 17/30772;
  (Continued)

(56) References Cited

U.S. PATENT DOCUMENTS 6,993,290 B1 * 1/2006 Gebis .................... H04H 60/66
                                                        455/186.1
8,060,407 B1   11/2011 Delker et al.
(Continued)

FOREIGN PATENT DOCUMENTS

| CN | 2781659 Y | 5/2006 |
|----|-----------|--------|
| CN | 100421152 C | 9/2008 |
| WO | WO 01/35667 A1 | 5/2001 |

OTHER PUBLICATIONS

Combined Chinese Office Action and Search Report dated Dec. 23, 2013 in Patent Application No. 201010243168.7 (submitting English translation only).

(Continued)

*Primary Examiner* — Fan Tsang
*Assistant Examiner* — David Siegel
(74) *Attorney, Agent, or Firm* — Oblon, McClelland, Maier & Neustadt, L.L.P.

(57) ABSTRACT

The present invention relates to a mobile audio player, comprising memory means adapted to store music data and non-music data, input means adapted to receive a user input with user preferences, radio program generating means adapted to generate, without a connection to an external entity, an individualized radio program from stored music data and non-music data depending on user preferences input via the input means, and audio output means adapted to output audio signals representing a generated radio program.

21 Claims, 3 Drawing Sheets

(51) Int. Cl.
  *H04N 21/81* (2011.01)
  *H04N 21/475* (2011.01)
  *G06F 17/30* (2006.01)
(52) U.S. Cl.
  CPC ..... *G06F 17/30772* (2013.01); *H04N 21/812* (2013.01); *G06F 17/30017* (2013.01); *G06F 17/30029* (2013.01); *G06F 17/30041* (2013.01); *H04N 21/4755* (2013.01)
(58) Field of Classification Search
  CPC ......... G06F 17/30017; G06F 17/30029; G06F 17/30041; H04N 21/812; H04N 21/4755
  See application file for complete search history.

(56) References Cited

U.S. PATENT DOCUMENTS

| | | | |
|---|---|---|---|
| 8,244,589 B2* | 8/2012 | Vincent | G06Q 30/02 455/414.1 |
| 2005/0262528 A1 | 11/2005 | Herley et al. | |
| 2005/0273491 A1* | 12/2005 | Meyer | H04N 1/32144 709/203 |
| 2006/0167576 A1* | 7/2006 | Rosenberg | G06F 17/30032 700/94 |
| 2010/0064053 A1* | 3/2010 | Bull | H04N 21/254 709/231 |
| 2010/0082397 A1 | 4/2010 | Blegen | |
| 2010/0093273 A1 | 4/2010 | Hohl | |
| 2010/0106572 A1 | 4/2010 | van Hoff et al. | |
| 2010/0251094 A1 | 9/2010 | Holm et al. | |
| 2012/0208512 A1* | 8/2012 | Maharajh | G06F 17/30035 455/414.1 |

OTHER PUBLICATIONS

European Examination Report dated Nov. 8, 2011, in Patent Application No. 10 169 768.8.

* cited by examiner

MOBILE AUDIO PLAYER WITH INDIVIDUALIZED RADIO PROGRAM

CROSS REFERENCE TO RELATED APPLICATIONS

This application is a continuation of U.S. application Ser. No. 12/828,715, filed Jul. 1, 2010, which claims the benefit of priority from European Patent Application No. 09166839.2, filed Jul. 30, 2009, the contents of which are both incorporated by reference in their entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention relates to a mobile audio player adapted to output an individualized radio program.

Mobile audio players adapted to store and output audio signals representing music, speech and so forth are in widespread use, either as devices which exclusively store and play audio signals, such as so-called "MP3" players and the like, or as part of mobile phones, PDAs, laptops and the like. Typically, a user stores music data and/or non-music data from an external source, such as the Internet, a personal computer and so forth, into the mobile audio player and is then able to listen to the stored content anytime and anywhere. Most mobile audio players have something like a "playlist" functionality in which a user can select music and/or non-music content according to his or her preferences, but in any case the selection is limited to pre-generated and pre-stored content. Some mobile audio players additionally have a radio functionality, i. e. are adapted to receive AM or FM signals from radio stations, so that the user can listen to a wanted radio broadcast while being in reach of a corresponding radio transmitter. Hereby, the listening experience is restricted to general broadcast content which is generated centrally in a remote radio station and broadcast to a large number of users simultaneously. Further, it is necessary that the mobile audio player is within the reach of a transmitter of a radio station in order to be able to receive the radio signals and output audio signals representing the respective radio program.

(2) Description of Related Art Including Information Disclosed Under 37 CFR 1.97 and 1.98.

BRIEF SUMMARY OF THE INVENTION

The object of the present invention is to provide a mobile audio player which is adapted to provide a user with a radio program which is individualized to the user's preferences.

The above object is achieved by a mobile audio player according to independent claim 1. The mobile audio player according to the present invention comprises memory means adapted to store music data and non-music data, input means adapted to receive a user input with user preferences, radio program generating means adapted to generate, without a connection to an external entity, an individualized radio program from stored music data and non-music data dependent on user preferences input via the input means, and audio output means adapted to output audio signals representing a generated radio program.

The present invention therefore provides a user with a radio station like listening experience anywhere and everywhere without the mobile audio player being connected by wire or wirelessly to an external entity providing the radio content. The mobile audio player according to the present invention is adapted to generate and individualized radio program using stored music data and non-music data in contrast to outputting a stored radio program or outputting a radio program consisting of pre-stored and/or pre-generated music and non-music content. The term "generate" is hereby intended to define a functionality which creates content in order to give a user an individualized listening experience on the basis of user preferences. Although parts of the individualized radio program, mainly the music parts, will be taken from stored content within the mobile audio player, other parts, for example spoken parts between musical pieces, commercials, jingles and so forth, can be created in the mobile audio player itself.

Advantageously, the radio program generating means comprises content generating means adapted to generate audio content during the generation of the individualized radio program. The generated content could be music content or non-music content, such as speech or the like, or a mixture thereof. Generating content hereby means that the resulting generated content is new and was not present before. Hereby, the content generating means may advantageously comprise a synthesizing means adapted to create audio data from raw data stored in said memory means during the generation of the individualized radio program.

Further advantageously, the radio program generating means is adapted to generate said individualized radio program on the basis of context parameters. Thus, in addition to the user preferences which are used to generate the individualized radio program, additional context parameters could be taken into account and used as parameters for the generation of the radio program.

Further advantageously, the radio program generating means comprises a commercials generating means adapted to generate commercials during the generation of the individual radio program on the basis of said context parameters. This functionality enables an even higher degree of individualization of the radio program by taking into account the context in which the mobile audio player and the user are currently in. Advantageously, the mobile audio player may comprise context detecting means adapted to detect one or more context parameters regarding the context of the mobile audio player and/or the user. Advantageously, the context detecting means comprises a location detecting means adapted to detect a current location of the mobile audio player as a context parameter. Additionally or alternatively, the context detecting means comprises a speed detection means adapted to detect a moving speed of the mobile audio player. Additionally or alternatively, the context detecting means comprises a moving method detection means adapted to detect a moving method of the mobile audio device. Examples for moving methods are walking, running, riding a train, riding a bicycle, riding a car and so forth. Alternatively or additionally, the context detecting means comprises sensor means adapted to sense one or more physical states of a user.

Further advantageously, the mobile audio player according to the present invention may comprise context receiving means adapted to receive one or more context parameters regarding the context of the mobile audio player and/or the user from an external entity. For example, the context receiving means may be adapted to receive traffic information, weather information, time and date information and the like. The receipt of these context parameters could be implemented by any kind or wired or wireless link between the mobile audio player and the external entity.

The present invention is further directed to a commercials generating means adapted to generate commercials from raw data on the basis of context parameters. The commercials generating means could be realized as a software program and could for example be pre-stored on a storage element and is adapted to create new commercials on the basis of one or more of the above-mentioned and described context parameters or additional context parameters. Hereby, the commercials generating means uses raw data in the form of text data or any other data which are available in any kind of other suitable format to create commercials or advertisements which are individualized for a specific user on the basis of respective context parameters. In addition to the creation of new commercials, the commercials generating means may be adapted to select pre-existing or pre-stored commercials on the basis of the context parameters. For example, the context parameters may refer to the context of a mobile audio player into which said commercials generating means is loaded and/or the user of the mobile audio player. The mobile audio player could be a mobile audio player according to the present invention as defined above. The context parameters could for example relate to the current location of the mobile audio player, traffic information related to a current and/or future location of the mobile audio player, the moving spread and/or the moving method of the mobile audio player, one or more physical states of a user of the mobile audio player, weather information, time and date information and/or any other suitable context parameters.

The present invention further relates to a commercials providing system adapted to provide commercials which are generated and can be adapted based on context parameters relating to the context of a user. The commercials providing system could be a software tool or product or could be implemented in any other suitable manner as a stand alone product or implemented in a suitable device, such as but not limited to a mobile audio player according to the present invention. It is to be understood that the commercials providing system could implement some or all functionalities of the commercials generating means as defined above. Also, the commercials providing system, from a business point of view, could be used to finance or enhance profits of the individual radio program system of the invention.

The present invention therefore suggests a mobile audio player with a central configurable play-out module in form of a radio program generating means which uses different sources of radio program elements, such as, but not limited to, songs, transitions, new items, commercials, sweepstakes and so forth to create an individualized radio program on the basis of context information. Thus, the present invention suggests a new play mode for mobile audio players consisting in a radio station like experience without the need for the mobile audio player to permanently receive a real radio broadcast or a data transmission for the generated radio program. Further, the generated radio program is based on audio content the user likes and for example has pre-stored on the mobile audio player and is personalized to the user of the mobile audio player and his or her context.

The mobile audio player according to the present invention could be realized as any kind of device, apparatus, element or the like adapted to output audio signals via a suitable output element, such as one or more loudspeakers, headphones and so forth to a user. The mobile audio player could be a "stand alone" device which is only provided with the necessary functionalities to generate and output the individualized radio program in line with the present invention, or could be part of another element or device or could be combined with additional functionalities. For example, the mobile audio player according to the present invention could be part of a laptop, a cell phone, a PDA or the like. The term "means" is used throughout the present specification to identify functional elements adapted to perform specific functions which could be realized and implemented as any kind of element, unit, device, implementation, hard- and/or software or the like adapted to perform the respective functionalities. Each "means" as mentioned and defined throughout the present specification could be part of or combined with any other "means" identified in the present specification or any other mentioned or not mentioned element, unit or the like.

BRIEF DESCRIPTION OF THE SEVERAL VIEWS OF THE DRAWINGS

The present invention will be explained in more detail on the basis of the following embodiments in relation to the enclosed drawings, in which.

DETAILED DESCRIPTION OF THE INVENTION

Figure 1:
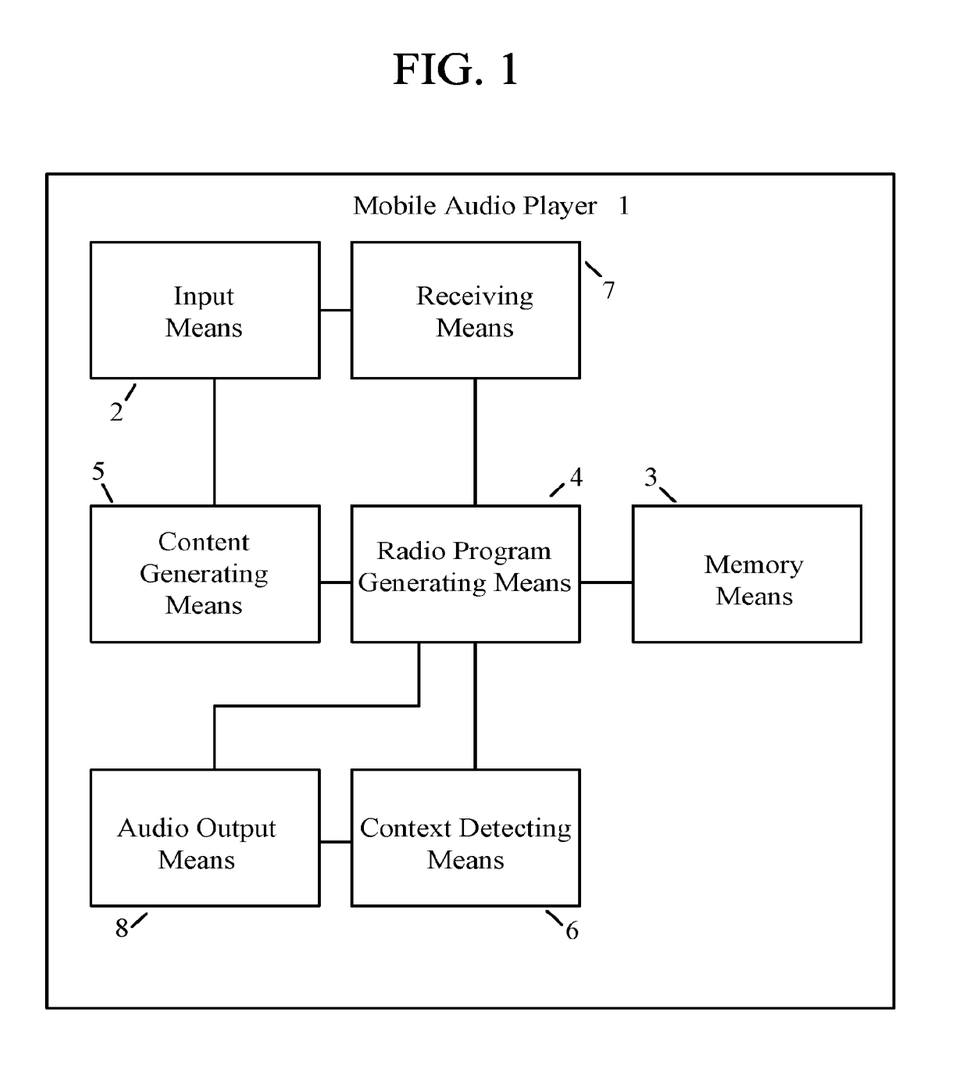
FIG. 1 shows a schematic block diagram of general embodiment of a mobile audio player according to the present invention.

FIG. 1 shows a schematic block diagram of a general embodiment of a mobile audio player 1 according to the present invention. The mobile audio player 1 comprises memory means 3 adapted to store music data and non-music data. The memory means 3 can be realized as one or several storage elements (as e.g. shown as storage elements 3a, 3b, 3c in FIG. 3). The mobile audio player 1 further comprises input means 2 adapted to receive a user input with user preferences. The input means 2 can be realized as any suitable input element, such as but not limited to input keys, an input keyboard, touch screen or any other suitable input device adapted to receive a user input defining user preferences relating to the wanted individualized radio program. The user preferences may include any type of preferences, likings, choices, selections and so forth a user might have regarding the format and the content of the radio program. The mobile audio player 1 further comprises radio program generating means 4 adapted to generate an individualized radio program from music data and non-music data stored in the memory means 3 depending on the user preferences input via the input means 2. The radio program generating means 4 is hereby adapted to generate the individualized radio program without a connection to and without receiving data from an external entity, i. e. without any kind of broadcast or communication connection to another entity or device. The mobile audio player 1 further comprises audio output means 8 adapted to output audio signals representing a generated individualized radio program generated by the radio program generating means 4.

The mobile audio player 1 of the general embodiment of FIG. 1 further comprises content generating means 5 adapted to generate or create new audio content during the generation of the individualized radio program. For example, the content generating means may comprise a synthesizing means which is adapted to create audio data from raw data, such as text data or the like, stored in the memory means 3 during the generation of the individualized radio program. The radio program generating means 4 may for example comprise a commercials generating means which is adapted to generate commercials during the generation of the individual radio program on the basis of context parameters regarding the context of the mobile audio player 1 and/or the user. The commercials generating means could alternatively be part of the content generating means 5 mentioned above. The mobile audio player 1 further may comprise context detecting means 6 adapted to detect one or more context parameters regarding the context of the mobile audio player and/or the user. Further, the mobile audio player 1 may comprise a context receiving means 7 adapted to receive one or more context parameters regarding the context of the mobile audio player and/or the user from an external entity, for example via any kind of wireless or wired connection. Examples of context parameters which could be detected by the context detecting means 6 are the current location of the mobile audio player 1, the moving speed of the mobile audio player 1, the moving method of the mobile audio player 1 (for example walking, running, cycling, driving etc.), one or more physical states of the user and so forth. Examples for context parameters received by the receiving means 7 are traffic information, weather information, time and date information, news information and so forth. The time and date information may also be available from a corresponding time and date providing element within audio player 1.

As stated above, the general idea of the present invention is to provide a mobile audio player providing a radio station like music listening experience for a user as opposed to purely playing out music from a set using any kind of selection mechanism. The generation of an individualized radio program as suggested by the present invention exclusively for a specific user based on user preferences provides a much more personalized radio program as any kind of broadcasted radio program services can ever be. Further, the generation of the individualized radio program according to the present invention does not require any connection to an external entity, for example a reception of a radio broadcast channel or the like. The radio program generating means 4 uses only music content from the memory means 3 in a first step and shapes the radio program as much as possible to the individual user by taking into account the user preferences as well as one or more context parameters, such as a news broadcasts, weather forecasts, traffic situations, the current location of the mobile audio player 1, the target location of the mobile audio player 1, the current time and date, the moving method (driving, walking, riding etc.) and the like of the mobile audio player 1. Either context sources connected to or implemented in the mobile audio player 1 can be used, such as the mentioned context detecting means 6, or context data sources in an external location could be employed, from which the context parameters are received via the mentioned context receiving means 7. The receipt of the context parameters will for example take place through the Internet, wireless LAN (Local Access Network), RDS (radio data system) or the like.

The individual radio program is created by the radio program generating means 4 using music data, for example songs, from this memory means 3 of the mobile audio player 1, from elements (for example musical pieces, jingles and/or a mixture thereof) that are dynamically created in the mobile audio player for example by the mentioned content generating means 5 and/or the mentioned commercials generating means, and optionally from elements that have been created before either on an external entity, such as a personal computer, or within the mobile audio player 1, and are stored in the mobile audio player 1. If data that shall be presented within the individualized radio program to the user exist as text and since the radio experience shall not be broken by using the different output medium like a text display, the text needs to be converted in the speech during the creation of the individual radio program. This can for example be done by using synthesizing means as mentioned above which could be comprised in the content generating means 5 or in the commercials generating means. Further, the way the individual radio program is generated could be changed according to a number of predefined styles, which could for example be associated to the style of famous radio disc jockeys.

Figure 2:
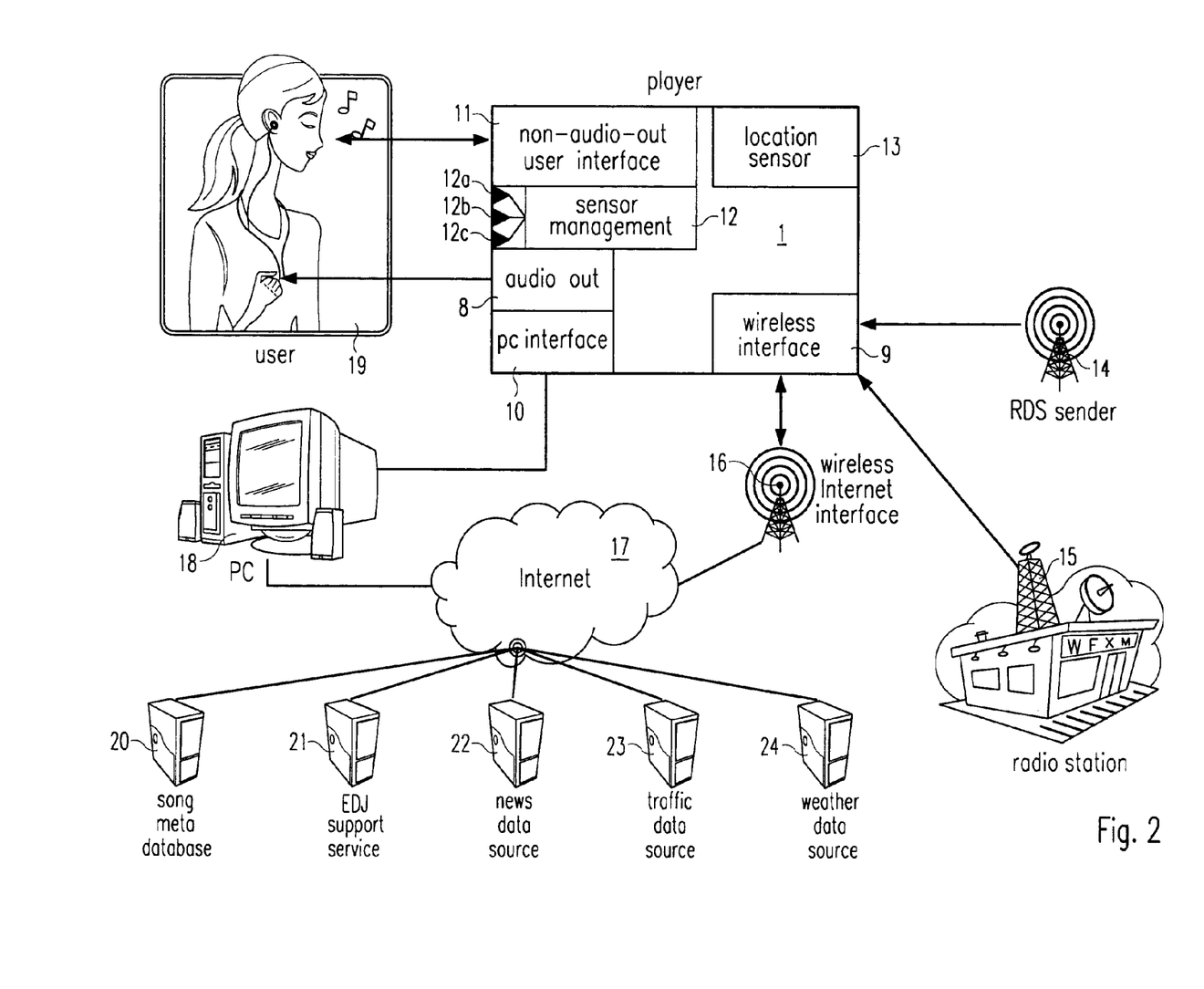
FIG. 2 shows a schematic diagram of the mobile audio player of FIG. 1 and optional connections to the external entities.

FIG. 2 shows a further example of the mobile player 1 of the invention and its relation to other elements outside the player. These elements are the user 19, the pc 18, the Internet 17, the song meta database 20, the individual radio program support service 21, the news data source 22, the traffic data source 23, the weather data source 24, the wireless Internet interface 16, the radio station 15, and the RDS sender 14. These elements connect to the player 1 by the means of some of the inner modules of the player 1, namely the non-audio-out user interface 11, the sensor management 12, the audio out 8, the PC (Personal Computer) interface 10, the wireless interface 9, and the location sensor 13.

In the following these elements will be explained.

The player 1 is the device that allows the user to listen to his/her audio content stored at the player using the "individual radio program" play mode. A player 1 can be mobile or stationary. It is often able to connect to another device, e.g. a PC via some wired or wireless connection. The player 1 can use the PC device 18 to access a larger compute power and/or storage capacity, and to get data needed for the "individual radio program" play mode. Sometimes the player 1 features a wireless interface 9 that allows the player 1 to access the Internet 17 wirelessly, some real radio station broadcast and/or RDS transmissions.

The PC 18 (that can be a Personal Computer, but might also be another type of device, e.g. a gaming console) is able to connect to the player 1 and to deliver data the player 1 can use for the individual radio program play mode. These data is often may stem from song meta data bases, some individual radio program support services, and sources for news, traffic, and weather data. These sources of data may be accessed via the Internet 17 or another network.

There might be one or a number of different song meta database(s) 20 operated by different parties. These databases offer meta data for songs, artists, and/or records.

The individual radio program support service 21 provides data and services that are necessary to provide the individual radio program play mode of the mobile audio player 1.

Examples for this data include the different individual radio program personalities, commercials, and sweepstakes. Examples for such services include the sweepstake service that evaluates the sweepstakes a user participates in and handles wins and losses.

The news data source 22 offers news articles, often as texts.

The traffic data source 23 offers traffic information, often as texts.

The weather data source 24 offers weather information, often as texts, and often separated for different regions or cities.

The wireless Internet interface 16 allows the mobile audio player 1 to access the Internet wirelessly. This device could be e.g. a WLAN Access Point or a HotSpot, a 2G or a 3G base station or the like.

The radio station 15 is a conventional radio broadcast station that transmits either digitally or analogue.

The RDS sender 14 is a source of information typically found in RDS transmissions, such as time, data, traffic information, and so on. Apart from the RDS service, such a sender could also use a similar service that uses an own transmission channel.

It should be understood that the mobile audio player 1 of the present invention as shown in FIG. 1 may comprise none, some or all of the elements of the mobile audio player 1 as shown in and explained in relation to FIG. 2.

Figure 3:
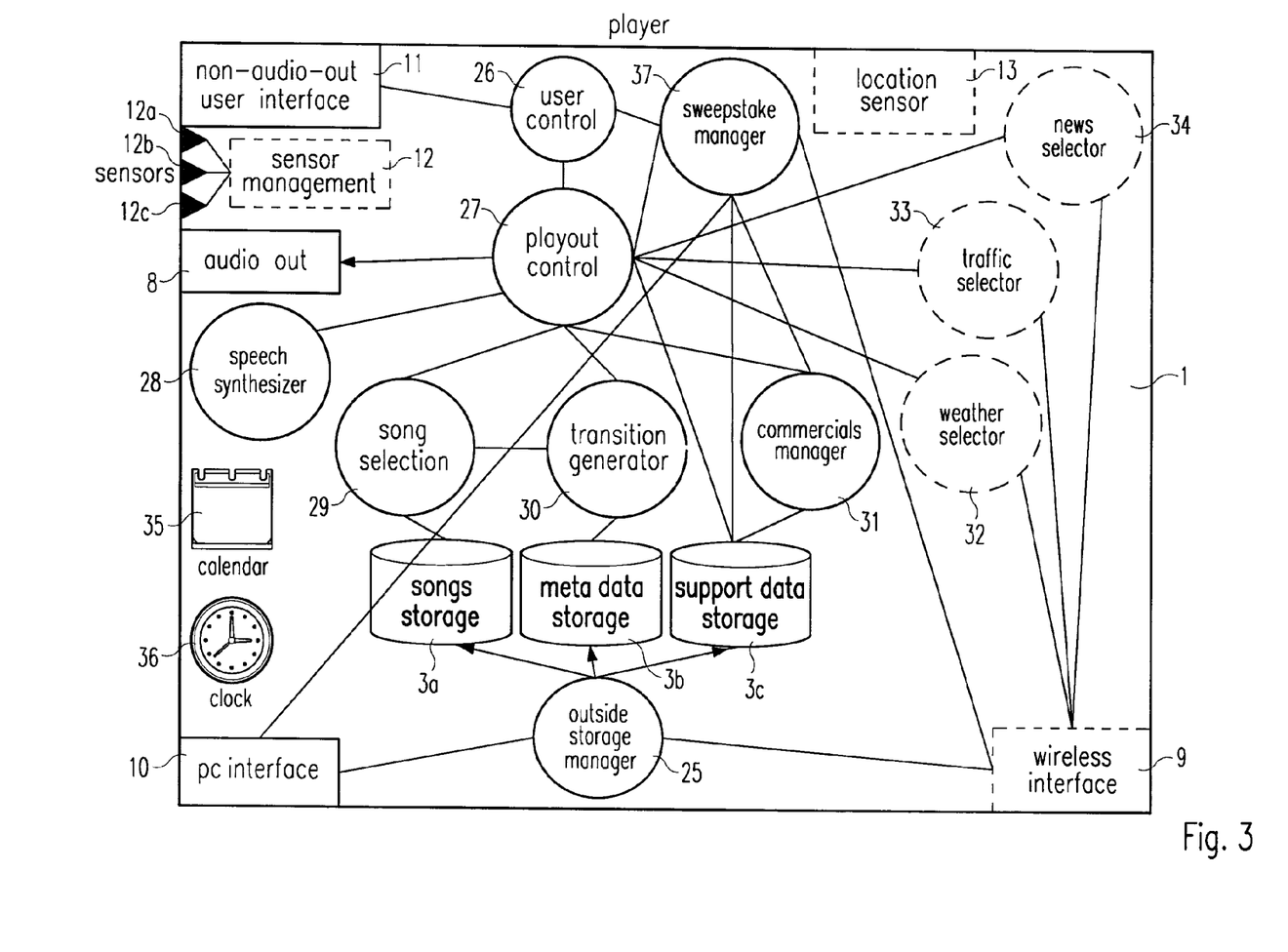
FIG. 3 shows a more detailed block diagram of the mobile audio player of the present invention.

FIG. 3 shows some of the necessary and optional inner components of the mobile audio player 1 of the present invention in more detail. In the following these elements and inner components of the mobile audio player 1 will be explained. It should be understood that the mobile audio player 1 of FIG. 3 comprises some or all the elements of the mobile audio player 1 of FIG. 1 (and FIG. 2) in a slightly different and more detailed representation. The memory means 3 of FIG. 1 can e.g. be realized as a songs storage 3a, a meta data storage 3b and a support data storage 3c which are controlled by means of an outside storage manager 25 connected to the wireless interface 9 and the PC interface 10 as shown in FIG. 3. The commercials generating means described for the mobile audio player 1 of FIG. 1 could be realized as a commercials manager 31 as shown in FIG. 3. The content generating means 5 of FIG. 1 can e.g. be realized as a combination of the commercials manager 31, a transition generator 30, a song selection component 29 and/or a speech synthesizer 28 as shown in FIG. 3. The radio program generating means 4 of FIG. 1 can e.g. be realized as a playout control 27 as shown in FIG. 3. The content generating means 5 could be part of the radio program generating means 4 or could be a separate element. The context detection means 6 of FIG. 1 can e.g. be realized as sensors 12a, 12b, 12c (controlled by a sensor management element 12), a calendar 35, a clock 36 and/or a locations sensor 13 as shown in FIG. 3. The context receiving means 7 of FIG. 1 can e.g. be realized as a news selector 34, a traffic selector 33 and/or a weather selector 32 as shown in FIG. 3.

The playout control 27 is the component that schedules the radio program, connects the single elements of the program, renders elements that exist only as text into the audio form using the speech synthesizer, all using the selected individual radio program personality. Scheduling the radio program means that this component has first to put some time-fixed, recurring elements of the program such as the news and often also the commercials into their respective places. Into that frame, the scheduling tries to fit in the different additional elements such as songs, transitions, sweepstakes and other elements, so that the time without an element is minimized and the songs do not need to be cut for length. Apart from this beforehand-scheduling, also a dynamic scheduling component can be considered by the playout control 27. This dynamic scheduling is needed when breaking news, traffic or weather items show up for which the current program needs to be interrupted. As the time-fixed program elements such as the news have to keep their time-slot, the playout control 27 might decide to re-schedule the rest of the program in order to cope with the changed time slots. Alternatively, these dynamically occurring items (e.g. breaking news) can simply replace parts of the current program so that the original schedule can be kept. Connecting the different elements depends on the selected individual radio program personality. In the simplest case, a connection is made by just adding two elements consecutively. In more complex cases, a complete element or a part of an element is mixed to the subsequent element partially or completely.

If the mobile audio player 1 contains a sensor (e.g. one of the sensors 12a, 12b, 12c) that can measure the stress level, and if the setup by the user is accordingly, the playout control 27 monitors the stress level and, once it detects an increase of stress, tries to minimize the stress induced by listening to the individual radio program service by e.g. choosing less exciting items connections, changing the pretended mood of the DJ to "calm" or even by replacing the DJ personality by one that is less exciting. In addition, the playout control 27 can e.g. reduce the volume of the "audio out" signal and signal the song selection to select more calm songs.

The user control component 26 manages the communication of other components, e.g. the playout control 27, or the sweepstake manager 37, with the user via the non-audio-out user interface 11. It comprises e.g. means to setup the individual radio program play mode, i.e. allows to set up the currently used individual radio program personality and other parameters. It also informs interested applications upon user actions, e.g. if the user presses a button.

The song selection component 29 generates a list of songs to be played consecutively using some algorithm. This algorithm can take a number of possible parameters into account, including the mood of the user, the previous song in the list, the location of the user, the clock, the date, and so on. One can distinguish between algorithms that plan ahead only for the next song, thus taking into account recent changes in the parameters and algorithms that plan ahead a number of songs thus giving the playout control 27 the possibility to e.g. let the needed transitions being synthesized in time.

To that end, the song selection can query the playout control 27 for already existing items on the playout list. Once the song selection component decided about the songs in its scope, it gets the corresponding songs from the songs storage 3a and returns them to the playout control 27 and informs the transition generator 30 on this list.

For the song selection, any suitable algorithm can be used.

If the mobile audio player 1 contains a sensor that can measure whether the user likes/dislikes a song, the song selection can use this information to rank up or down songs stored in the mobile audio player 1 over time. As the user might like a song more (or less) than usual only temporary (after all, the user actively stored this song on his/her mobile audio player 1), the song selection has to be able to cope with this phenomenon.

The transition generation component 30 aims at generating transitions between songs in the style of a certain Radio DJ personality. To that end it is informed by the song selection component 29 about a number of songs to be played consecutively in the future and the currently used Radio DJ personality by the playout control component 27. The transition generation then consults the meta data storage 3b on meta data about the two songs to connect and selects zero, one, or more meta data categories where the values are the same for both songs (e.g. the songs are from the same band and from the same album). It then selects some information from the meta data storage 3b that relates to these values and categories (e.g. simply the album name) and creates a transition moderation e.g. as a text. This to-be-read moderation text can then be enriched by sound effects from the support data storage 3c that also relates to the meta data of either both songs or the next song. As an example the DJ could shout the moderation text while trying to drown the noise from bypassing racing cars when the next song is about car races. This transition moderation is then given to the playout control 27 together with the information to which song transition in the playlist of the song selection component it relates to.

The audio out 8 is a component that is able to convert an audio file into a audio signal that the user can hear.

The non-audio-out user interface component 11 provides means to interact with the user excluding the audio out means 8. These means can range from a some-buttons-only interface up to the multi-touch-capable large display with dedicated keyboard. This component is managed by the user control component 26.

The speech synthesizer 28 gets text from the playout control 27 as well as setup information such as the required voice, mood of the speaker, and so on. It then returns an audio file that contains a speech version of the text.

The calendar 35 is a data source open to all other components that returns the current date according to some known date base.

The clock 36 is a data source open to all other components that returns the current time according to some known time base.

The location sensor 13 is a device that is able to find out the location of the mobile audio player 1 with some accuracy, and to return the location, the accuracy and other data, e. g. a GPS device.

The PC interface 10 is a device that enables other components (especially the outside storage manager 25) to communicate with the PC device 18. There are many technologies that can be used for this interface, e.g. Ethernet or USB. In some implementations, the wireless interface can play also the role of the PC interface 10.

The wireless interface 9 is a device that enables other components (especially the outside storage manager 25, the news selector 34, the weather selector 32, and the traffic selector 33) to communicate with some external communication partners wirelessly. There are many technologies that can be used for the wireless interface 9, not only alternative ones, but also such that are used in parallel, like e.g. Bluetooth, WLAN, GSM, UMTS, and so on.

The outside storage manager 25 handles the checking for new items and transferring them to the storage components 3a, 3b, 3c as soon as either a connection to the PC (through the PC interface) is made or, typically periodically (e.g. every day) when a wireless connection (through the wireless interface) exists. New songs are stored in the song storage 3a. For the invention, the automatic (i.e. not initiated by the user) transfer of songs is optional. New meta data items go into the meta data storage 3b. The update frequency of these items will be very low if the set of songs is not extended. If new songs were transferred, it is likely that also the meta data storage 3b needs to be updated with items relating to the new songs. New support data items go into the support data storage 3c. The update frequency on this type of items depends on the concrete subtype of these items. Commercials and sweepstakes might be updated e.g. only on a daily basis whereas pre-recorded content from the PC might be updated with every connection.

The songs storage component 3a stores the audio content of the mobile audio player 1, e.g. songs, audio books, and the like.

The meta data storage component 3b stores the meta data items that relate to the songs in the song storage 3a. Meta data contains e.g. the composers and the lyrics writers of the song, the musicians that performed the song, the music publisher, and so on. It also contains meta data on the persons that contributed to the song (like the composer, the performers, etc.) and on the bands that performed the song, on the album the songs was contained, and so on. Meta data is typically stored in computer readable form, i.e. either as data of some formal data representation system, and/or as text.

The support data storage component 3c stores all the data items needed for the operation of the individual radio program that were not stored in the song or meta data storage. Some of the types for these items are e.g. different individual radio program personalities. These personalities are typically sets of setups for the playout control 27 (e.g. the style of when and how combining speech and song elements) and the speech synthesizer 28 (e.g. the voice) this mimicking different Radio DJs. Further examples for the types of these items are commercials, sweepstakes, pre-recorded audio content and the like. Commercials can be pre-recorded audio content or text messages that will be read by the voice of the DJ or a mix of both possibilities. Sweepstakes may e.g. consist of two parts. The content part is what the user hears explaining her/him the sweepstakes, the prices, and finally the challenge that the user shall take (e.g. answering a certain question). This content can be stored either as text or as pre-recorded audio content. The second part is a data file or program that specifies the reaction of the sweepstake manager in case of reactions of the user on the sweepstake. Pre-recorded audio content can be used by the playout control 27 directly and e.g. comprises sounders like jingles, station claims, or the station name, or entire program parts already converted to speech from text at the PC.

The commercials manager component 31, is adapted to create commercials tailored to the taste, needs and situation of the user if required, and is adapted to manage the playout of the commercials in the course of a individual radio program. In order to create such "tailored" commercials, this component obtains "commercial templates" from the support data storage 3c. These templates contain raw material (such as texts, music, and sounds) that can be used for creating the commercials and some "tailoring directives" that allow this component to adapt the commercial towards the user using any information about the user and its situation that can be found in the system such as the currently played out song, song lists, the individual radio program setup, the current time and date, the current location, the current traffic situation, the mood of the user, the stress level of the user, etc, and to mix the raw material and the user context data together into a final commercial, optionally using the speech synthesizer in order to convert texts into spoken language. These directives can be either a program or some input for an adaptation mechanism, e.g. an XSLT stylesheet. As a result, the commercials manager 31 might e.g. be adapted to create an ice cream commercial hinting to the nearest seller of a certain brand when it is hot outside and the stress level is low, a clothing commercial for an assumed fashion taste that is derived from the type of music the user is usually listening to, a restaurant commercial if the corresponding restaurant is nearby and the user is in a traffic jam if it is about lunch time, a restaurant commercial containing an audio voucher the value of which is higher the nearer the user is to a competitive restaurant. In order to manage the playout, this component 31 gets either pre-fabricated commercials from the support data storage 3c or tailored commercials according to the last paragraph and sends them to the playout control 27. The playout control 27, in turn, is not free to schedule them as it decides to do, but has to play out them at defined points in time.

Compared to normal radio, commercials are an expected part of the broadcast, but for an audio player 1 adding commercials will only be accepted by the user if she/he gets something in return that outweighs the burden of having to listen to something not as attractive as the own songs. One example of such compensation is the possibility to participate in sweepstakes. Therefore the commercials manager 31 is adapted to signal to the sweepstake manager component 37 the number of commercials played out since a certain point in time. In order to increase the acceptance of commercials, first, the user can either grant the system the right to play out commercials in return of some benefits or she/he can switch the commercials plus benefits feature off. Apart from sweepstakes, another compensation for listening to commercials might be the operation of the individual radio program service itself, i.e. in return for having commercials the user can use the individual radio program service for free.

The sweepstake manager 37 manages sweepstakes on the individual radio program system. Often sweepstakes can be used as a means of compensation for listening to a number of or certain commercials. Therefore the commercials manager 31 signals to the sweepstake manager the playout of certain commercial or a number of these. Upon receiving e.g. this start signal, the sweepstake manager 37 selects one sweepstake from the support data storage 3c and offers it to the playout control 27 for playout. It also prepares for processing the reaction of the user as soon as the sweepstake audio part is played out by employing the second part of the sweepstake. In the simplest case the user does not react on the sweepstake or stops it manually thus allowing the system to end the sweepstake without the need of further action (the sweepstake manager 37 of course could decide to start this sweepstake again later on). If the user reacts on the sweepstake, e.g. by pressing one of the buttons on the non-audio-out user interface, the sweepstake manager 37 is informed about this fact by the user control component and uses the second part of the sweepstake in order to react on the user input. Reactions could include sending a message to an individual radio program support service via the wireless interface or the pc interface, thus triggering sending a prize to the lucky winner, or loading a new feature for the individual radio program service.

The news selector 34 accesses different news sources using the wireless interface 9. Whenever possible, it searches for and selects those news items that relate to the current situation of the user, e.g. her/his current location, route, interests, and so on. The news selector 34 signals the existence of news items to the playout control 27 denoting also whether there are breaking news the user should listen to immediately.

The optional sensors 12a, b, c are devices that are able to sense some physical states of the user, such as liking/disliking of a song, stress level, change of mood or any other suitable state.

The sensor management component 12 acts as a mediator between the sensors 12a, b, c and the other components that want to access information on the physical state of the user.

The traffic selector 33 accesses different traffic news sources using the wireless interface 9. Whenever possible, it searches for and selects those traffic news items that relate to the current traffic-related situation of the user, e.g. her/his current location, route, means of transportation, and so on. The traffic news selector 33 signals the existence of traffic news items to the playout control 27 denoting also whether there are urgent traffic news.

The weather selector 32 accesses different weather news sources using the wireless interface 9. Whenever possible, it searches for and selects those weather news items that relate to the current and future locations of the user. The weather selector 32 signals the existence of weather news items to the playout control 27 denoting also whether there are urgent weather news.

The following section briefly explains some of the possible radio program elements, which are e. g. songs, song transitions, factlets, periodic new, breaking news, time announcements, commercials, sweepstakes, sounders etc.

Songs are pre-recorded audio recordings that are the core content of the mobile audio player 1. Song transitions are audio recordings that lead the listener from a first song to a second song. Sometimes, a transition can be empty. A factlet is an audio recording that tells the listener some non-actual fact (i.e. a factlet is not a news item), e.g. the bands one musician played in during his musical career. Periodic news are audio recordings containing facts of events that happened not so long ago. In context of the individual radio program, they shall be of potential interest for the user, but they do not require the attention of the user urgently. Periodic news include weather forecasts, and traffic news. In contrast to periodic news, breaking news require the urgent attention of the user, e.g. new traffic jam messages on roads the user will use in the next future. Weather news are typically breaking news only if a severe weather condition occurs surprisingly. Time announcements are an audible reading of the current local time. There are no changes needed compared to commercials aired in a regular radio program. Commercials can be pre-produced audio pieces and/or text that is read by the (voice of the) DJ. However, the invention is in addition able to produce personalized commercials instead of the same commercials for a broad audience that take into account the interests and other context data of the user. One can e.g. think about commercials whose "airing" (i.e. play out point of time) depends on context data such as the location. As a result, the user might hear a commercial from a certain fast food chain as soon as the user is approaching the next restaurant of this chain. Either regular sweepstakes aimed at a large audience can be used or personalized sweepstakes can be created, e.g. using data from the meta data database. Sounders are short audio recordings that are needed by a radio DJ to give a radio program structure and some "brand recognition". Examples for sounders are jingles, station claims, or the station id.

In reality, different radio DJ personalities attract their audience to a radio program differently, i.e. the personal style of the radio DJ is an important part of a radio program. In order to reflect this, and in order to allow the user to further personalize the individual radio program system, a set of artificial radio DJ styles is offered among which the user can select one. An individual radio program radio DJ personality is a set of configurations for the individual radio program system that either shall reflect the style of a real radio DJ or subsume just a certain configuration. These configurations include:

The way consecutive program items are mixed together. One personality would e.g. announce the title of the following song in the first part of the song that contains no text (the so-called ramp-up) while another one would have the announcement completed before the song The configuration of the song selection module, thus resulting in playing e.g. preferably songs from a certain time period The selection of the used sounders The voice that is used for speech synthesis The configuration of the transition generator with the result that e.g. one personality prefers to add factlets into transitions while another one maybe uses jokes.

Apart from choosing a radio DJ personality, another additional option could be a location-based radio program mode where the songs and possibly also other program items deal with the current location of the user. This could lead from things from more abstractly to playing the song "Autobahn" when being on a highway to hearing "New York, New York" when entering the New York city area. As this might be fun only in some situations, e.g. when being in holidays, it could annoy the user in an everyday's situation. Therefore, this possibility should be optional and de-selectable by the user.

Sometimes the user might be interested in listening more from or about a band, a song, or a musical style upon hearing a corresponding song. "Elaborate on . . . " function reconfigures the individual radio program service dynamically so either e.g.

the band playing the current song the current song the musical style of the current song becomes the special subject of the radio program. This means that the system dynamically re-selects songs, re-schedules the playout list and does all other things required to concentrate on the current subject.

If the mobile audio player 1 contains a sensor 12a that can measure the level of stress of the user and/or whether the user is in a calm or excited mood, the individual radio program can offer a "calm down" function that aims at holding the user in a calm mood with a low level of stress. To that end, the individual radio program monitors the level of stress and the degree of mood calmness and reacts if one or both values are larger than a threshold value. Upon stating this, the playout control component 27 aims at configuring the DJ personality to a more calm degree. Additionally, the playout control 27 can schedule training sessions that aim at helping the user regain his/her calm. In addition, the song selection re-selects the list of upcoming songs towards more calm music. This process can even be iterated as long as the threshold value is fallen below.

The "power up" function works like the "calm down" function, but aims at holding the user in an excited mood with a certain level of stress.

In order to allow the user to immediately profit from winning a sweepstake or having a voucher-like coupon with some commercials our invention also allows issuing "audio vouchers". These audio vouchers are either pre-fabricated or generated audio files whose playout can be controlled by the system. Controlling playout in this case either means that the number of playouts of a single voucher can be restricted to a certain number. Or it employs a nonce-response scheme used e.g. in secure computer communication protocols where e.g. the waiter in the restaurant generates a random number that the user e.g. types in the mobile audio player 1. The mobile audio player 1 then generates an audio voucher that contains this random number in a form that cannot be forged by a 3rd party and that proves that the audio voucher was not replayed by e.g. the use of another audio recorder. In addition to the playout control, an audio voucher might contain a hidden or audible serial number and/or a hidden audible watermark in order to allow controlling and tracking audio vouchers. Generated audio vouchers can either by generated as computer-processable audio files e.g. using acoustic modems or as human-audible audio files e.g. using the speech synthesizer. Both techniques transform digital data into an audible form, but only the latter can be understood by humans.

It should be understood that the mobile audio player 1 of the present invention could comprise additional elements and components in addition to the ones shown in and explained in relation to FIGS. 1, 2 and 3. All elements and components of the mobile audio player explained above are only examples and can be implemented using any kind of suitable technique, such as any kind of software or hardware implementation or a mixture thereof.

The invention claimed is:

1. An apparatus, comprising:
   circuitry configured to
   store music data and non-music data in a memory;
   receive a user input;
   generate an individualized radio program, including audio content from the music data and the non-music data, based on the user input;
   output audio signals representing the individualized radio program;
   generate a commercial with a commercial template that includes pre-rendered text data and audio fragment data, the pre-rendered text data and audio fragment data of the commercial template being selected according to both the user input and a location of the apparatus; and
   output audio signals representing the commercial when the location of the apparatus corresponds with a stored location that matches at least one of the pre-rendered text data and the audio fragment data of the commercial template.

2. The apparatus according to claim 1, wherein said circuitry is further configured to generate the audio content representing the individualized radio program during the generation of the individualized radio program.

3. The apparatus according to claim 2, wherein said circuitry is further configured to generate the audio data representing the individualized radio program from raw data stored in said memory during the generation of the individualized radio program.

4. The apparatus according to claim 1, wherein said circuitry is further configured to generate said individualized radio program according to the user input and the location of the apparatus.

5. The apparatus according to claim 1, wherein said circuitry is further configured to detect the location of the apparatus.

6. The apparatus according to claim 1, wherein
   said circuitry is further configured to detect a moving speed of the apparatus, and
   the circuitry generates the commercial according to the detected moving speed of the apparatus.

7. The apparatus according to claim 1, wherein
said circuitry is further configured to detect a moving method of the apparatus, and
the circuitry generates the commercial according to the detected moving method of the apparatus.

8. The apparatus according to claim 1, wherein
said circuitry is further configured to sense one or more physical states of the user, and
the circuitry generates the commercial according to the one or more physical states of the user.

9. The apparatus according to claim 1, wherein said circuitry is further configured to receive the user input from an external entity.

10. The apparatus according to claim 9, wherein said user input includes traffic information.

11. The apparatus according to claim 9, wherein said user input includes weather information.

12. The apparatus according to claim 9, wherein said user input includes time and date information.

13. The apparatus according to claim 1, wherein said circuitry is further configured to generate the commercial according to at least one of a taste, a need, and a situation of the user.

14. The apparatus according to claim 1, wherein the commercial template includes tailoring directives used to adapt a generated commercial to the user, the tailoring directives using at least one of information about the user and information about a situation.

15. The apparatus according to claim 14, wherein the at least one of the information about the user and information about the situation include at least one of a currently played song, a song list, a setup of the individualized radio program, a current date, a current time, a current location, a current traffic situation, a mood of the user, and a stress level of the user.

16. The apparatus according to claim 1, wherein, after the output of the audio signals representing the commercial, the circuitry is further configured to enter the user of the apparatus into a sweepstakes competition.

17. The apparatus according to claim 16, wherein the circuitry is further configured to output the sweepstakes competition to the user.

18. The apparatus according to claim 1, wherein
the circuitry is further configured to count a number of items of the audio content, and
the circuitry is further configured to output the audio signals representing the commercial when the number of the items of the audio content exceeds a predetermined threshold.

19. The apparatus according to claim 1, wherein the circuitry is configured to generate the individualized radio program based on context parameters.

20. The apparatus according to claim 19, wherein said context parameters include information relating to the location of the apparatus and information relating to the user input.

21. The apparatus according to claim 19, wherein said context parameters include information relating to at least one of traffic information related to a current and/or future location of the apparatus, moving speed and/or moving method of the apparatus, one or more physical states of a user of the apparatus, weather information, and time and date information.

* * * * *